United States Patent [19]

Okada

[11] 4,392,170
[45] Jul. 5, 1983

[54] MAGNETIC RECORDING DISC CARTRIDGE WITH DISC CLEANING MEANS

[75] Inventor: Shuhei Okada, Toyonaka, Japan
[73] Assignee: Hitachi Maxell, Ltd., Osaka, Japan
[21] Appl. No.: 268,891
[22] Filed: Jun. 1, 1981

[30] Foreign Application Priority Data

Jun. 2, 1980 [JP] Japan .............................. 55/75151[U]
Jun. 2, 1980 [JP] Japan .............................. 55/75152[U]

[51] Int. Cl.³ ............................................. G11B 23/02
[52] U.S. Cl. .................................................. 360/133
[58] Field of Search ................. 360/133, 99, 137, 128; 206/444, 309, 312–313; 15/210 R

[56] References Cited

U.S. PATENT DOCUMENTS 3,668,658 6/1972 Flores .................................. 360/133
4,251,843 2/1981 Masuyama et al. ................. 360/137
4,263,634 4/1981 Chenoweth et al. ............... 360/133
4,354,213 10/1982 Martinelli ........................... 360/128

Primary Examiner—Alfred H. Eddleman
Attorney, Agent, or Firm—Birch, Stewart, Kolasch & Birch

[57] ABSTRACT

A magnetic recording disc cartridge so called a floppy disc comprising a cover jacket member enclosing a magnetic recording disc with a cleaning sheet disposed between the inside face of the cover jacket member and the magnetic recording disc, including thermally bonding portions for bonding the sheet member and the cleaning sheet, in which the bonding portions are a plurality of dots formed around the peripheral portion of a central window along a plurality of lines radially extending from the peripheral edge of the central window for a predetermined distance.

7 Claims, 8 Drawing Figures

MAGNETIC RECORDING DISC CARTRIDGE WITH DISC CLEANING MEANS

FIELD OF THE INVENTION

The present invention relates to a magnetic recording disc cartridge for reproducing magnetic records such as sound signals, video signals and data signals.

BACKGROUND OF THE INVENTION

A magnetic recording disc cartridge of the above type which is so called a floppy disc is composed of a flexible recording disc and a cover jacket for accommodating the recording disc within a chamber formed between a pair of square-shaped sheets of the jacket made of relatively hard material with a cleaning sheet interposed between the inner face of the outer sheet and the recording disc.

Such a magnetic recording disc cartridge has various advantages such, for example, the magnetic recording disc inside the jacket is not stained by dust in the outside atmosphere or magnetic powders since the recording disc can be loaded in a reproducing apparatus without removing the jacket and handling thereof is very simple.

However, a conventional magnetic recording disc cartridge has still various disadvantages due to the way of bonding the cleaning sheet to the outer sheet as mentioned hereinafter.

Such a magnetic recording disc cartridge will hereinafter be described in detail with reference to FIGS. 1 and 2 of the accompanying drawings.

The magnetic recording disc cartridge comprises a cover jacket 1 and a magnetic recording disc 2 contained therein. The magnetic disc 2 is formed by a base film made of plastic having flexibility and elasticity and has a central hole 3 for engagement with a drive shaft of a reproducing apparatus and a recording zone a presenting recording tracks.

The jacket 1 includes a generally rectangular outer sheet 4 made of synthetic resin material such as hard vinyl or polyester, and the outer sheet 4 has flaps 5A, 5B and 5C for heat bonding purpose. A cleaning sheet 6 made of non-woven cloth including thermoplastic fibers such as polyester fibers, nylon fibers or polypropylene fibers is placed on one side of the outer sheet 4 and thermally welded to the same to form linear weld patterns 7A, 7B and 7C.

In two pairs of square sheet portions 4A, 4B and 6A, 6B of the outer sheet 4 and the cleaning sheet 6 respectively, divided by a center line b, there are provided central windows 8 being larger in diameter than the central hole 3 of the magnetic disc for exposing the circular area of the disc around the periphery of the central hole 3, elongated head windows 9 for contact with an access head of a reproducing apparatus over the recording zone a of the magnetic disc 2 and index windows 10 for detecting a track starting point in the peripheral direction of the disc 2 and thereby determining the point of time for starting movement of the magnetic disc 2 in its diametrical direction for proper tracking.

Around the central windows 8 and the head windows 9 of the cleaning sheet 6, there are formed double or triple linear heat-bonding portions 11A and 11B along the peripheral portions of the windows 8 and 9 for preventing dropout of the filaments of the non-woven cloth.

The outer sheet 4 to which the cleaning sheet 6 is thermally bonded is bent along the center line b with the side having the cleaning sheet 6 inside, and the magnetic recording disc 2 is interposed between the square sheet portions 6A and 6B of the cleaning sheet 6. Then the flaps 5A, 5B and 5C are respectively bent along lines c to be bonded to the outer surface of one square sheet portion 4A of the outer sheet 4.

Since the non-woven cloth around the peripheries of the windows 8 and 9 of the cleaning sheet 6 are partially bonded with the outer sheet 4 by welding at the heat-bonding portions 11A and 11B in this magnetic recording disc cartridge, the cleaning effect in these portions are not spoiled and fluffing and dropout of the filaments are effectively prevented.

However, since the heat-bonding portions 11A and 11B are continuously formed around the windows 8 and 9 of the outer sheet, during the process of bonding the cleaning sheet and the outer sheet, the jacket is apt to be undesirably deformed due to the heat treatment whereby the circular peripheral edge portion of the jacket around the central window is slightly projected out of the plane of the major portion of the jacket.

Therefore, when the magnetic disc is inserted into the chamber of the jacket, the leading edge portion of the magnetic disc with respect to the direction of the insertion thereof is apt to be engaged with the projected portion, thereby preventing smooth insertion of the magnetic disc into the jacket, causing the magnetic disc to be crushed or damaged.

In addition, such deformation of the jacket reduces the commercial value of the magnetic disc cartridge.

Further, in the conventional magnetic recording disc cartridge, the trailing sides of the index windows 10 on the cleaning sheet 6 with respect to the direction of rotation of the magnetic recording disc 2 are not bonded to the outer sheets 4. Therefore, occasionally the filaments of the non-woven cloth on the trailing sides get fluffy by rotation of the magnetic recording disc 2 and tend to lie down toward the windows 10 or the non-woven cloth on the trailing sides is stretched by sliding contact with the disc 2 so as to gather around the windows 10. In such cases, detection sensitivity at the index windows 10 is lowered to cause errors in operation.

SUMMARY OF THE INVENTION

It is, therefore, an essential object of the present invention to provide a magnetic recording disc cartridge capable of eliminating the various drawbacks being inherent in the conventional cartridge as mentioned above and which can be manufactured without any undesirable deformation of the jacket of the cartridge as described above, thereby facilitating smooth installation of a magnetic recording disc into the jacket.

Another object of the present invention is to provide a magnetic recording disc cartridge capable of preventing dropout of signals recorded in the magnetic recording disc.

A further object of the present invention is to provide a magnetic recording disc cartridge which can be manufactured with a high commercial value.

According to one embodiment of the present invention, there is provided a magnetic recording disc cartridge comprising a magnetic recording disc, a cover jacket means having a chamber defined by a pair of opposing sheet members for rotatable accommodation of the magnetic recording disc, each of the sheet members being provided with a central window for receiving a drive shaft of a reproducing apparatus, an elongated head window for receiving an access head of a reproducing apparatus and a small index window defined at the peripheral portion of the central window, a cleaning sheet disposed between each of the sheet members and the corresponding surface of the magnetic recording disc, the cleaning sheet being made of a nonwoven cloth and having central windows, head windows and index windows each of which is formed corresponding to those of the windows defined on the sheet members, the improvement which comprises thermally bonding portions for bonding the sheet member and the cleaning sheet, the bonding portions being a plurality of dots formed around the peripheral portion of the central windows along a plurality of lines radially extending from the peripheral edge of the central window for a predetermined distance.

DESCRIPTION OF THE PREFERRED EMBODIMENT

Figure 1:
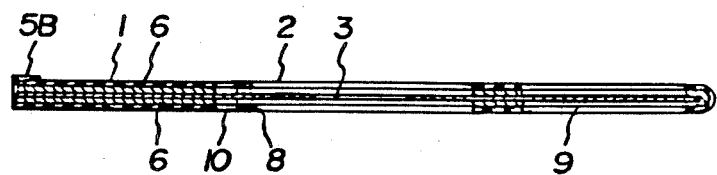
FIG. 1 is a cross sectional view of a conventional magnetic recording disc cartridge.
Figure 2:
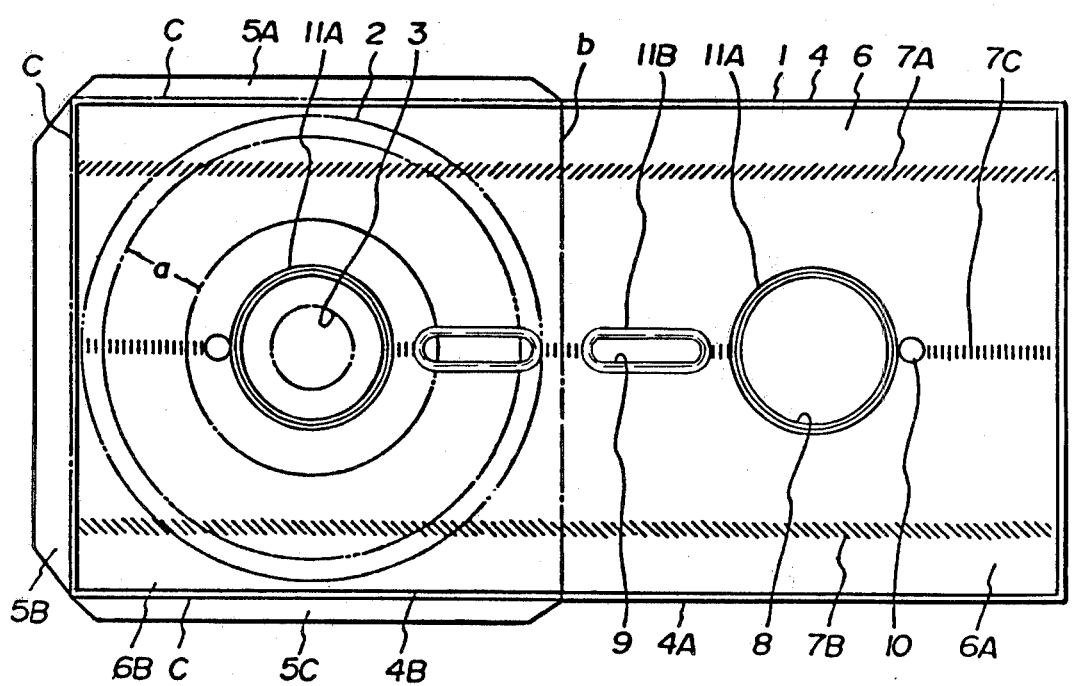
FIG. 2 is a top plan view in an open condition showing the interior of the cover jacket of a conventional magnetic recording disc cartridge.

Referring now to FIGS. 3 to 8 of the attached drawings, there is shown an embodiment of the magnetic recording disc cartridge according to the present invention which comprises a cover jacket 1 and a magnetic recording disc 2 (FIG. 8) rotatably received in the cover jacket 1 in a known manner.

The magnetic recording disc 2 is formed by a base film covered on one or both sides thereof with coated magnetic recording layers and has a central hole 3 (see FIG. 8) for engagement with a drive shaft of a recording/reproducing apparatus and an index hole 12 formed in a predetermined position for detecting a tracking starting point. By rotation of the disc 2 within the jacket 1, the index hole 12 passes an index window 10 formed in the jacket 1 for detecting the tracking starting point on the disc 2, and the rotating condition of the disc 2 is optically detected by a photosensor (not shown).

Figure 3:
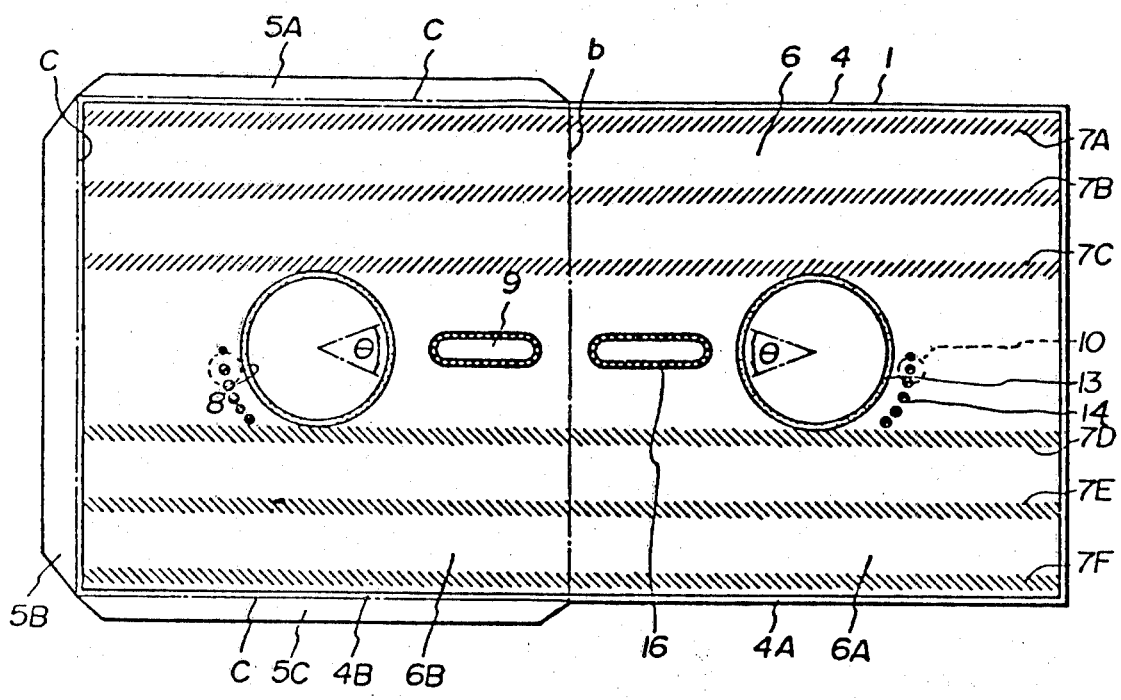
FIG. 3 is a top plan view in an open condition showing the interior of a cover jacket of the magnetic recording disc cartridge embodying the present invention.

The cover jacket 1 comprises an outer sheet 4 made of synthetic resin such as hard polyvinyl chloride and a cleaning sheet 6 made of non-woven cloth of polypropylene fibers or rayon fibers, and the cleaning sheet 6 is placed on one side of the outer sheet 4. As shown in FIG. 3, the cleaning sheet 6 has a pair of central windows 8 and six weld patterns 7A, 7B, 7C, 7D, 7E and 7F extending along the longitudinal direction of the cleaning sheet 6. Each of the weld patterns 7A to 7F is formed by a plurality of independent lines, each extending linearly with an inclination of about 45°, and the patterns 7A to 7C and 7D to 7F are oppositely inclined. The weld patterns 7A to 7F function to bond the cleaning sheet 6 to the outer sheet 4.

The outer sheet 4 and the cleaning sheet 6 are respectively provided with the central windows, head windows and index windows in predetermined positions.

Figure 4:
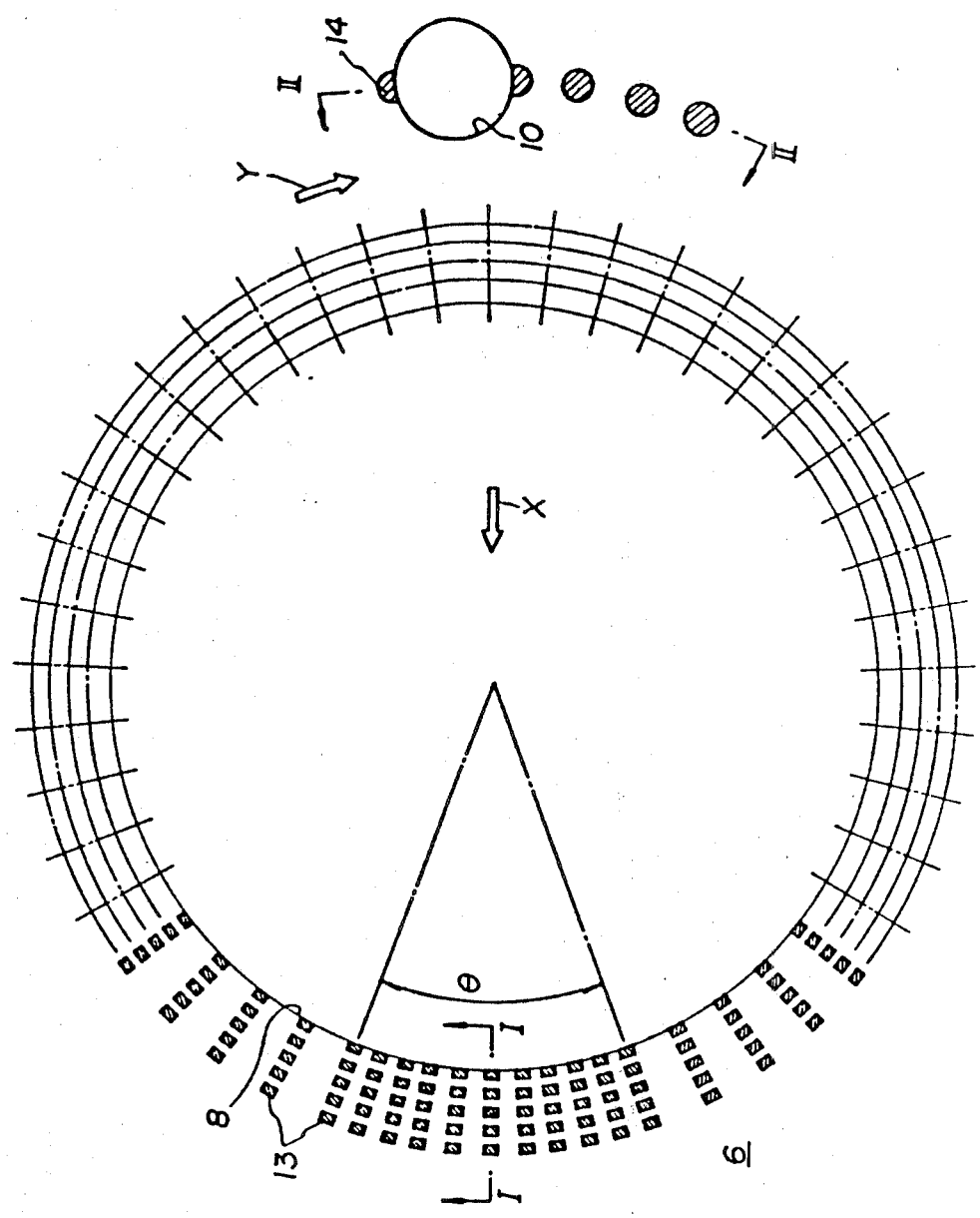
FIG. 4 is an enlarged top plan view showing the weld pattern around the periphery of the central window of the cover jacket.
Figure 5:
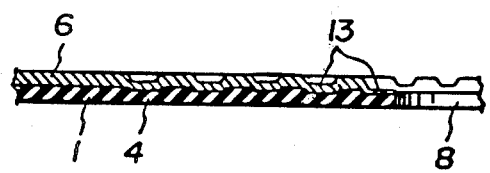
FIG. 5 is an enlarged cross sectional view taken along the line I—I in FIG. 4.
Figure 6:
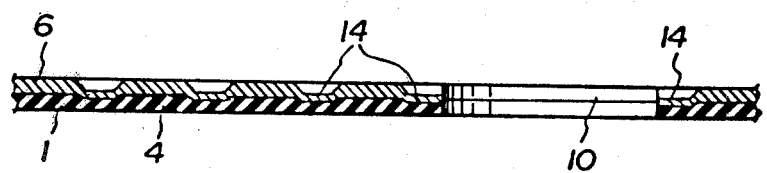
FIG. 6 is an enlarged cross sectional view taken along the line II—II in FIG. 4.

In order to prevent separation of the cleaning sheet 6 from the outer sheet 4 on the peripheral portions of the central windows 8, the cleaning sheet 6 is, as shown in FIGS. 4 and 5, fixedly bonded to the outer sheet 4 by first heat-bonding spots 13 formed by a plurality of dots having rectangular shapes. The first heat-bonding spots 13 are provided in a plurality of intermittent rows each of which extends radially from the central windows 8, and there is presented a non-bonded region between each two adjacent dots for effecting uniform and quick heat radiation upon bonding.

Figure 7:
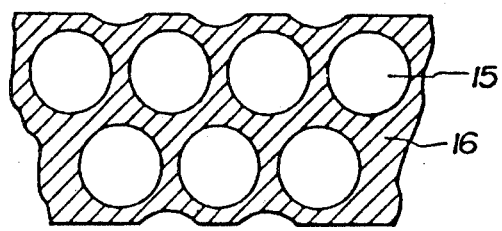
FIG. 7 is an enlarged top plan view showing the weld pattern around the periphery of the head window.
Figure 8:
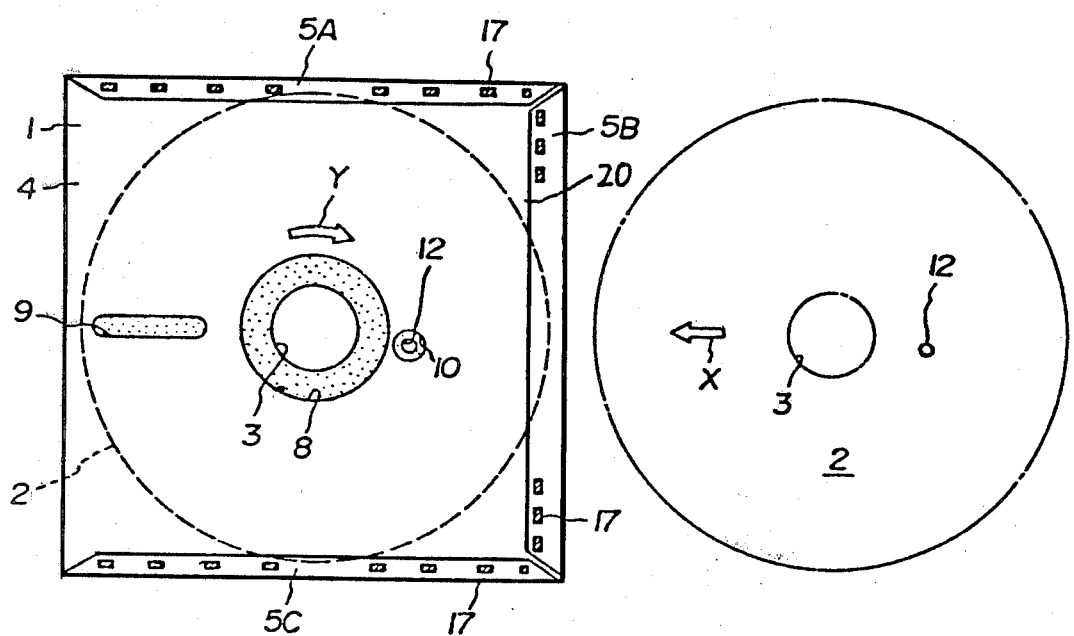
FIG. 8 is a bottom plan view of the magnetic recording disc cartridge according to the present invention.

With respect to distribution of the first heat-bonding spots 13, the heat-bonding spots 13 are not uniform in density, i.e., the numbers of the dots per unit area are varied, and said density is high in regions corresponding to the trailing side of the direction X of insertion of the disc 2 into the cover jacket 1 (see FIGS. 4 and 8). The opening angle $\theta$ of each of the central windows 8 is from center 0 in the aforementioned high-density regions is about 20° to 180°, and preferably 30° to 60°. In the embodiment as shown in FIGS. 3 to 8, the first heat-bonding spots 13 in the high-density regions are about twice as much as those in the other regions in the peripheries of the central windows 8. Furthermore, in the embodiment disclosed herein, each of the dots situated nearest the central windows 8 is formed just on the peripheral edge of the window 8 so as to ensure prevention of the separation of the cleaning sheet 6 from the outer sheet 1 around the central windows 8. Thus, the cleaning sheet 6 in the vicinity of the central windows 8 can be prevented from being peeled from the outer sheet upon insertion of the magnetic recording disc 2 into the cover jacket 1, so that filaments of the cleaning sheet 6 are not fluffed, and thus the leading end of the magnetic recording disc 2 will not be damaged.

Prior to formation of the index windows 10 in the cover jacket, there are provided in the portions of the cleaning sheet 6 in which the index windows 10 are to be formed a plurality of dots defining second heat-bonding spots 14 at short intervals along the direction Y of rotation of the magnetic recording disc 2 (FIGS. 4 and 8) to bond the cleaning sheet 6 to the outer sheet 4.

It is essential that the second heat-bonding spots 14 are located at least on the trailing side of the index window 10 with respect to the direction Y of the rotation of the disc 2 when the disc 2 is installed in the chamber of the jacket and is rotated by a recording/reproducing apparatus.

The second heat-bonding spots 14 are arranged in a curved row of a curvature conforming to the curvature of the central window 8, and the size of the spots 14 and the intervals therebetween are determined in consideration of the size of the index window 10.

There are two kinds of magnetic recording discs, one of which is provided with the magnetic recording layer only on one side of the disc and the other of which is provided with the magnetic recording layers on both sides thereof, and which index window 10 of the jacket is used is determined depending on which kind of the magnetic recording disc is enclosed in the jacket. In order to make the jacket member compatible for both kinds of the magnetic recording discs, the embodiment shown herein is provided with two rows of the second heat-bonding spots 14 for both of the index windows 10 defined on both of the cleaning sheet portions 6A and 6B.

However, it is not essential to provide the second heat-bonding portions on both sides of the cleaning sheets but the second heat-bonding portions are provided at least on the one side of the cleaning sheet which is opposed to the recording layer of the disc when a one-sided recording disc is enclosed in the jacket.

FIG. 4 shows the cleaning sheet 6 in which the second heat-bonding spots 14 are provided on both the trailing and the leading sides of the index window 10 with respect to the direction Y of rotation of the magnetic recording disc 2.

As shown in FIGS. 3 and 7, a heat-bonding portion 16 defined with a plurality of independent small circular heat-bonding spots 15 is formed in the periphery of each head window 9 of the cleaning sheet 6 to bond the same to the outer sheet 4. Bonding in the periphery of the head window 9 may also be conducted by a plurality of intermittent dot-shaped heat-bonding spots as in the case of bonding of the periphery of the central window 8. In such a case, the pattern of the dot-shaped heat-bonding spots is designed so that the dot-shaped heat-bonding spots on the leading side of the head window 9 with respect to insertion of the disc 2 become higher in density than those located on the other regions around the head window.

FIG. 8 is a bottom plan view of the magnetic recording disc cartridge. The rectangular outer sheet 4 bonded with the cleaning sheet 6 (not shown) on one side is folded along the center line b with the cleaning sheet 6 inside to form a chamber to receive the magnetic recording disc 2 between a pair of square portions 6A and 6B of the cleaning sheet 6. Thereafter, flaps 5A and 5C of the outer sheet 4 are respectively bent along the lines c to overlap with the corresponding peripheral edge portions of the square portion 4A thereof.

Subsequently, a magnetic recording disc 2 is inserted into the jacket from the opening 20 defined on the right side peripheral edge portion prior to being closed by the flap 5B in a direction as shown by the arrow mark X.

It is noted that since the leading side portions of the cleaning sheet near the central window 8 with respect to the direction of insertion of the recording disc are formed with high density, the cleaning sheet 6 is not separated from the outer sheet.

After the magnetic recording disc 2 is completely inserted into the jacket 1 as shown by the dotted lines in FIG. 8, the respective flaps 5A to 5C are bonded to the square portion 4A by a plurality of dot-shaped heat-bonding spots 17 spaced at certain intervals in the known manner.

As hereinabove described, the peripheries of the windows of the cleaning sheet for rotatingly driving the magnetic recording disc, having especially wide heat-bonding regions, are bonded to the inner surface of the outer sheet by a plurality of intermittent dot-shaped heat-bonding spots in the magnetic recording disc cartridge according to the present invention, and therefore heat distortion of the jacket upon heat bonding is effectively reduced to prevent deformation of the cover jacket, so that smooth rotation of the magnetic recording disc can be ensured.

Further, a plurality of heat-bonding spots are located on the trailing side of the index windows of the cleaning sheet with respect to the direction of rotation of the magnetic disc to fix the peripheries of the windows. By virtue of this, fluffing filaments of the non-woven cloth and part of the cloth around the windows will not enter the index windows upon rotation of the magnetic recording disc. Thus, tracking can be accurately conducted at all times by the magnetic recording disc cartridge according to the present invention to improve the reliability of the magnetic recording disc cartridge.

When the magnetic recording disc cartridge according to the present invention is loaded on a recording and/or reproducing apparatus in the known manner with the magnetic recording disc 2 rotated in a predetermined direction, since the cleaning sheets 6 are bonded to the outer sheet on the trailing sides of the cleaning sheet 6 near both of the index windows 8 with respect to the rotational direction of the recording disc 2 and the cleaning sheet is thus prevented from separating from the outer sheet and also the filaments of the cleaning sheet near the index window are not fluffed so that smooth rotation of the recording disc can be ensured thereby resulting in prevention of the dropout of the information recorded in the magnetic recording disc, the information can be reproduced with high fidelity.

In the present invention, the cleaning sheet, the index window and the head window can be provided only on the surface opposite to the magnetic recording layer when the magnetic recording disc has the magnetic recording layer only on one side.

What is claimed is:

1. A magnetic recording disc cartridge which comprises a magnetic recording disc, a cover jacket means having a chamber defined by a pair of opposed sheet members for rotatable accommodation of the magnetic recording disc, with the sheet members being provided with central windows on each of the sheet members for receiving a drive shaft of a recording/reproducing apparatus, at least one elongated head window for receiving a recording/reproducing head of said apparatus and at least one small index window defined at the peripheral portion of the central window on at least one of the sheet members, at least one cleaning sheet disposed between at least one of the sheet members and the corresponding surface of the magnetic recording disc, said cleaning sheet being made of a non-woven cloth and having central windows, head windows and index windows each of which is formed corresponding to the windows defined on the sheet members, and thermally bonding portions for bonding the sheet member and the cleaning sheet, said bonding portions being a plurality of dots formed around the peripheral portion of the central window along a plurality of lines radially extending from the peripheral edge of the central window for a predetermined distance.

2. A magnetic recording disc cartridge as claimed in claim 1, wherein said cover jacket means further comprises a plurality of thermally bonding portions located on the trailing side of the index window with respect to the direction of rotation of the disc on the cleaning sheet.

3. A magnetic recording disc cartridge as claimed in claim 1, wherein said thermally bonding portions around the central window are formed with the density of the bonding spots located on the leading side of the central window with respect to a direction of the insertion of the recording disc into the jacket means being higher than the density of the bonding spots located on the trailing side of the central window.

4. A magnetic recording disc cartridge as claimed in claim 1, wherein said high density bonding spots located on the leading side are disposed in an angular range of 20° to 120° with respect to the center of the central window.

5. A magnetic recording disc cartridge as claimed in claim 4, wherein said angular range is 30° to 60°.

6. A magnetic recording disc cartridge as claimed in claim 1, 2, 3, 4 or 5, wherein said jacket means further comprises a plurality of parallel lines of bonding portions extending linearly for bonding the cleaning sheet and the sheet members.

7. A magnetic recording disc cartridge as claimed in claim 1, 2, 3, 4 or 5, wherein each of the innermost bonding spots with respect to the central window is formed at the peripheral edge thereof.

* * * * *